United States Patent
Coonen et al.

(10) Patent No.: US 9,400,721 B2
(45) Date of Patent: *Jul. 26, 2016

(54) ERROR CORRECTION CODE SEEDING

(71) Applicant: Seagate Technology LLC, Cupertino, CA (US)

(72) Inventors: Daniel J. Coonen, Longmont, CO (US); Abhay T. Kataria, Longmont, CO (US)

(73) Assignee: SEAGATE TECHNOLOGY LLC, Cupertino, CA (US)

( * ) Notice: Subject to any disclaimer, the term of this patent is extended or adjusted under 35 U.S.C. 154(b) by 52 days.

This patent is subject to a terminal disclaimer.

(21) Appl. No.: 13/793,920

(22) Filed: Mar. 11, 2013

(65) Prior Publication Data

US 2014/0258812 A1    Sep. 11, 2014

(51) Int. Cl.
G06F 11/16    (2006.01)
G06F 11/10    (2006.01)

(52) U.S. Cl.
CPC ............ G06F 11/1666 (2013.01); G06F 11/10 (2013.01)

(58) Field of Classification Search
CPC .................. G11C 29/022; G11C 29/56; G11C 29/56004; G06F 11/1666; G06F 11/10
USPC ......... 714/769, 42, 32, 49, 54, 718, 738, 739; 365/201
See application file for complete search history.

(56) References Cited

U.S. PATENT DOCUMENTS

| | | | | |
|---|---|---|---|---|
| 6,115,793 A | * | 9/2000 | Gruber et al. ................. | 711/133 |
| 6,182,196 B1 | * | 1/2001 | DeRoo .......................... | 711/144 |
| 9,262,264 B2 | * | 2/2016 | Coonen ............... | G06F 11/1048 |
| 2003/0202270 A1 | * | 10/2003 | Ng et al. ......................... | 360/51 |
| 2004/0003172 A1 | * | 1/2004 | Su et al. ........................ | 711/112 |
| 2009/0106629 A1 | | 4/2009 | Araki | |
| 2009/0204824 A1 | | 8/2009 | Lin et al. | |
| 2009/0292972 A1 | | 11/2009 | Seol et al. | |
| 2012/0144249 A1 | | 6/2012 | Franceschini et al. | |
| 2012/0272038 A1 | * | 10/2012 | Wei et al. ...................... | 711/206 |
| 2012/0284589 A1 | | 11/2012 | Kim et al. | |

FOREIGN PATENT DOCUMENTS

| | | | |
|---|---|---|---|
| JP | H04-172662 A | 6/1992 | |
| JP | H07-36789 A | 2/1995 | |
| JP | 2000-66961 A | 3/2000 | |
| JP | 2003-331530 A | 11/2003 | |
| JP | 2010-123078 A | 6/2010 | |
| JP | 2012-243385 A | 12/2012 | |
| WO | WO2012013683 | * 2/2012 | ............. G11C 16/10 |

* cited by examiner

*Primary Examiner* — Albert Decady
*Assistant Examiner* — Kyle Vallecillo
(74) *Attorney, Agent, or Firm* — HolzerIPLaw, PC

(57) ABSTRACT

The technology disclosed herein provides a method of verifying data read from a data block when the cell number of the data block does not match an ECC value stored in the data block. In particular, the method includes designating as unusable a data block in an indexed sequence of data blocks, wherein each data block is associated with a physical index; associating a cell number with a subsequent usable data block following the identified data block in the indexed sequence; and recording in an offset table accessible by an error detection and correction module an offset in association with the cell number of the subsequent usable data block, wherein the combination of the offset and the cell number represents a seed for the error detection and correction module.

18 Claims, 6 Drawing Sheets

ERROR CORRECTION CODE SEEDING

CROSS REFERENCE TO RELATED APPLICATIONS

The present application is related to U.S. patent application Ser. No. 13/793,999, entitled "Error Correction Code Seeding" and filed concurrently herewith, which is specifically incorporated by reference herein for all that it discloses and teaches.

BACKGROUND

Unusable data blocks are discovered at several stages in drive processing. When such data blocks are discovered, the drive may be re-linearized so useable data blocks have sequential indices encoded in Error Correction Code (EEC) information on each of the data blocks. As a result of such re-linearization, the ECC information is rewritten on all usable data blocks so that the usable blocks have sequential indices. However, it can take several hours to re-linearize a single drive at considerable expense to the manufacturer.

SUMMARY

Implementations described and claimed herein address the foregoing problems by designating as unusable a data block in an indexed sequence of data blocks, wherein each data block is associated with a physical index; associating a cell number with a subsequent usable data block following the identified data block in the indexed sequence; and recording in an offset table accessible by an error detection and correction module an offset in association with the cell number of the subsequent usable data block, wherein the combination of the offset and the cell number represents a seed for the error detection and correction module.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. These and various other features and advantages will be apparent from a reading of the following Detailed Description.

DETAILED DESCRIPTION

Figure 1:
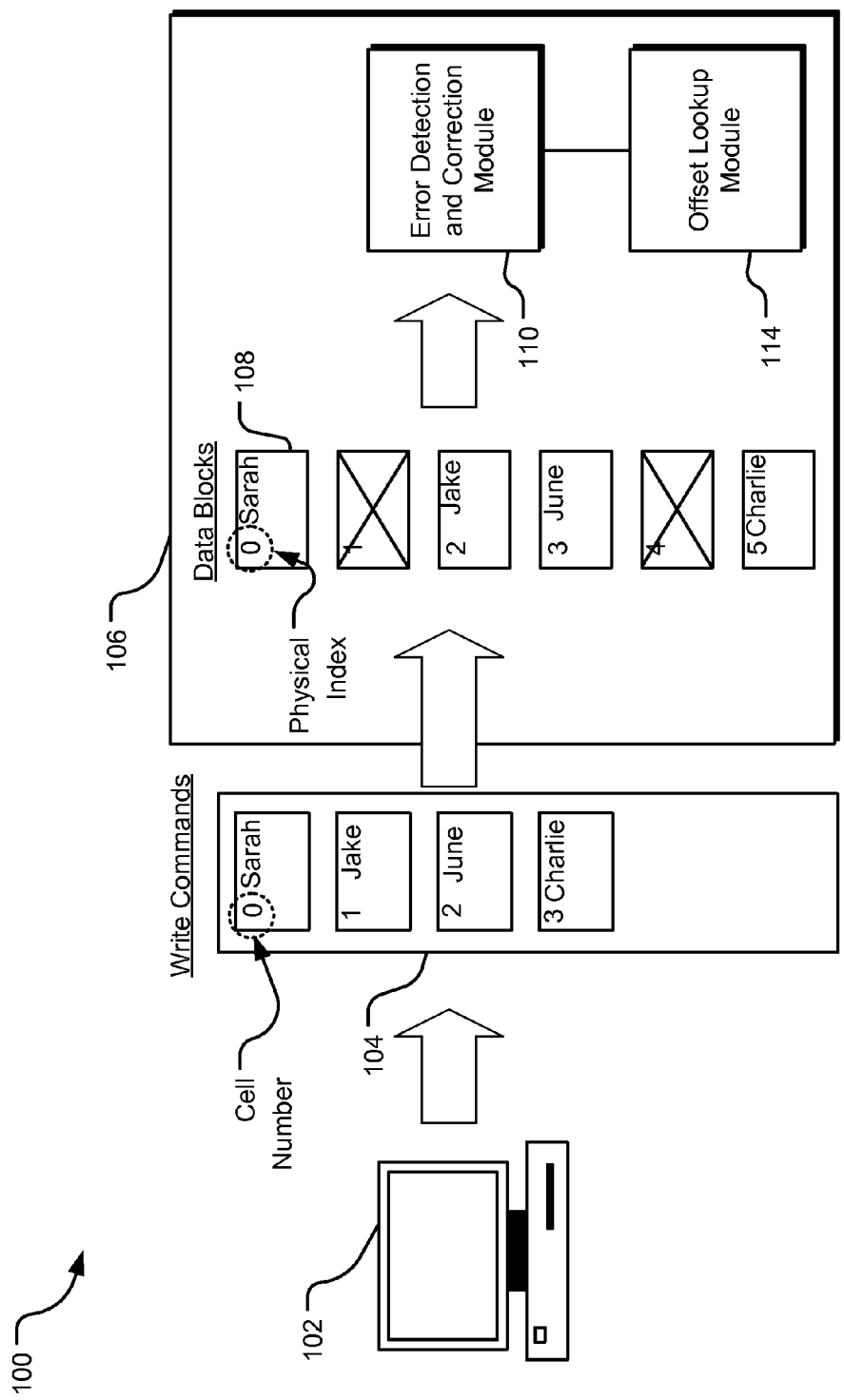
FIG. 1 illustrates a system having a mechanism for verifying data read from a data block when a cell number of the data block does not match an error correction code (ECC) value stored in the data block.

FIG. 1 illustrates a system 100 having a mechanism (e.g., an offset lookup module 114) for verifying data of a data block when the cell number of the data block does not match an error correction code (ECC) value stored in the data block. The system 100 includes a host computer 102 that sends one or more access commands 104 (e.g., read or write commands) to a storage drive 106. The storage drive 106 is a device having a tangible computer-readable storage media, which can store data in sequential units (e.g., cells or data blocks) that are accessible by a computer. Such tangible computer-readable media may include without limitation magnetic storage disks, solid state drives, flash memory, optical storage disks, random access memories (RAMs), read only memories (ROMS), and the like. The storage drive 106 includes a number of data blocks (e.g., a data block 108), which can hold a set number of storage bytes.

Each of the data blocks has a physical index (e.g., a physical index 0 in data block 108) associated with the data block's physical position in the indexed sequence of data blocks on the storage device 106. According to one implementation, sequential data blocks on the storage drive 106 are associated with consecutively increasing physical indices. Each of the data blocks also includes error correction code (ECC) information (not shown), including an ECC value that encodes the physical index of the data block.

Storage devices (e.g., the storage drive 106) may include a number of data blocks identified as bad or unusable during initial processing of the device. For example, block defects or irregularities (e.g., thermal asperities) on the surface of a disc may make one or more blocks of the disc unusable. Data blocks without actual physical defects may also be "unusable" because they are, for other reasons, selectively omitted from a storage device's data storage operations. Thus, the term "unusable" is used herein to denote a storage block that is for any reason selectively omitted from use in data storage operations.

When data is read back from a data block on the storage drive 106, the error detection and correction module 110 performs a data integrity check to ensure that the data read or written is correct and that the correct data block was accessed. To perform this integrity check, the error detection and correction module 110 uses a seed value and data read back from the data block to generate an ECC value. When the integrity check is successful, the ECC value generated matches the ECC value stored in the data block. However, such confirmation is generally not possible if the seed value does not match the physical index of the data block.

In FIG. 1, data blocks with physical indices 1 and 4 are identified as unusable during an initial factory processing operation. However, the storage drive 106 need not be re-linearized to exclude the unusable blocks 1 and 4 from the storage device's indexing scheme. Rather, the system 100 has been manufactured to include an offset lookup module 114, which may be a functional module in firmware. The offset lookup module 114 allows the error detection and correction module 110 to verify the integrity of data read from a data block even when the seed value input to the error detection and correction module 110 differs from the physical index of the data block.

In the example illustrated, the host computer 102 sends four access commands 104 to write four names (e.g., Sarah, Jake, June, and Charlie) to four target data blocks with cell numbers 0-3. Data (e.g., the name) associated with each of the four target data blocks is sent to the storage drive 106, along with a logical block address (LBA) corresponding to each of the data blocks. The storage device 100 converts the LBAs from the host computer 102 to cell numbers 0, 1, 2, and 3, respectively. Thereafter, a data allocation module (not shown) selects a physical block index to correspond to each of the cell numbers. To avoid writing data to the unusable blocks with physical indices 1 and 4, the data allocation module determines that the data associated with the cell numbers 0, 1, 2, and 3, can be allocated to physical data blocks 0, 2, 3, and 5, respectively. Consequently, the names Sarah, Jake, June, and Charlie are written to the physical data blocks 0, 2, 3, and 5.

When data is read back from one of the four target data blocks, the offset lookup module 114 calculates a seed value that can be used by the error detection and correction module 110 to verify the integrity of the data read from the target data block. In particular, the offset lookup module 114 accesses an offset table (not shown) and retrieves an offset associated with the cell number of the target data block. Using the cell number and the offset, the offset lookup module generates a seed value. The error detection and correction module 110 uses the seed value and data read back from the associated data block to calculate an ECC value, which is compared to the ECC value stored in the target data block.

For example, to verify the integrity of the data "Sarah," the offset lookup module 114 retrieves an offset of 0 associated with the cell number 0. Using the offset of 0, the offset lookup module 114 calculates a seed value of 0, which is used to calculate an ECC value that matches the ECC value stored in the data block having the physical index of 0.

Likewise, to verify the integrity of the data "Jake," the offset lookup module 114 uses the cell value of 1 to retrieve an offset of 1 and to calculate a seed value of 2. The error detection and correction module 110 uses the seed of 2 to calculate an ECC value that matches an ECC value stored that in the data block having the physical index of 2.

Similarly, to verify the integrity of the data "Charlie," the offset lookup module 110 retrieves an offset of 2 associated with the cell number of 3 and calculates a seed value of 5. The error detection and correction module 110 uses the seed value of 5 and data read back from the data block having the physical index 5 to calculate an ECC value that matches the ECC value stored in the data block with the physical index of 5. Consequently, data is written to sequential usable data blocks on the media, the integrity of the data is verified, and the drive is not re-linearized during initial drive processing.

Figure 2:
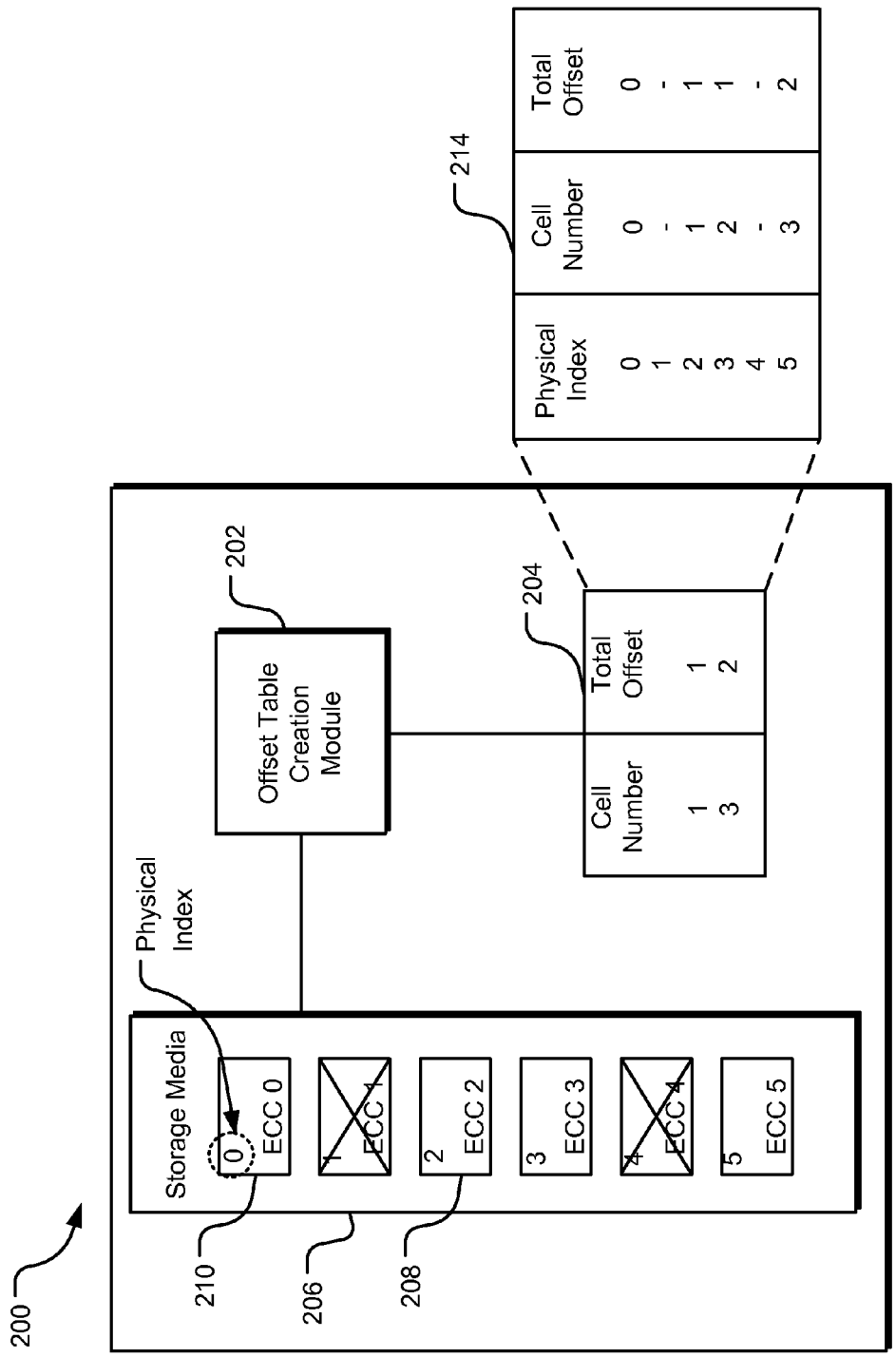
FIG. 2 illustrates a storage device having an offset table creation module that creates an offset table that can be used to calculate a seed value for an error detection module.

FIG. 2 illustrates a storage device 200 having an offset table creation module 202 that creates an offset table 204 that can be used to calculate a seed value for an error detection module (not shown), and thus verify the integrity of data read from a data block. The storage device 200 includes a storage media 206 that has a number of data blocks (e.g., data blocks 208 and 210) capable of storing a set amount of data. The storage media 206 may be any type of tangible computer-readable media; however, in one implementation, the storage media is a magnetic disc and the data blocks are sequential sectors along a data track on the disc. In another implementation, the storage media is a solid state drive (SSD).

Each of the data blocks on the storage media 206 has a physical index (e.g., a physical index 0 in data block 210) associated with the data block's physical position in an indexed sequence (e.g., a sequence including both usable and unusable data blocks on the storage media 206). Additionally, each of the data blocks has encoded EEC information that encodes the physical index of the data block (e.g., the encoded physical index "ECC 0" in data block 210). During a factory formatting operation, which may be after the ECC information is encoded on each of the data blocks, unusable data blocks (e.g., unusable data blocks with physical indices 1 and 4) are identified on the storage media 206 by an error detection module (not shown).

A mechanism for error checking data blocks in a sequence that selectively omits unusable blocks from storage operations is implemented via an offset table creation module 202. The offset table creation module 202 associates the physical indices of the usable data blocks with corresponding cell numbers (where the cell numbers collectively represent the unbroken sequence of usable data blocks) and records in an offset table 204 incremental offset values in association with select cell numbers. Such offset values may subsequently be used to check the integrity of data written and read during disk storage operations.

FIG. 2 also includes a logical table 214 (which may or may not be included in memory) exemplifying logic used to derive the offsets of the offset table 204. In particular, the logical table 214 has a "Physical Index" column that includes physical indices corresponding to both the usable and the unusable data blocks on the storage media 206. The logical table 214 also has a "Cell Number" column that includes a cell number in association with each usable data block. For example, the physical indices 1 and 4 do not have a corresponding cell number in the offset table 204 because such data blocks have been identified as unusable by the error detection module. Thus, the set of consecutive cell numbers 0, 1, 2, and 3 correspond to the physical indices of sequential, usable data blocks 0, 2, 3, and 5, respectively. An offset (e.g., a total offset value in the logic table 214) represents the difference between the physical index and the cell number of a data block. The total offset value increments by 1 in association with each usable data block following an unusable data block in the indexed sequence. For example, the total offset value increments by 1 in association with the physical index 2 because the physical index 2 corresponds to the next usable data block following the unusable data block with physical index 1. Similarly, the total offset again increments by 1 in association with the physical index 5, because the physical index 5 corresponds to the next usable data block following the unusable data block with physical index 4. The information illustrated in the logic table 214 is condensed into the offset table 204 and stored in memory of the storage device 200 by the offset table creation module 202.

The offset table creation module 202 does not record in the offset table 204 an offset associated with every usable physical index on the storage device. Rather, an offset is recorded in association with each usable data block having a first sequential physical index affected by the increment (e.g., the first usable data block following an unusable data block in the indexed sequence of physical indices). For example, the cell numbers 1 and 2 are both affected by an offset of 1. However, the physical index 2 is the first physical index affected by the offset of 1. Therefore, the offset of 1 is recorded in association with the physical index of 2.

The offset table creation module 202 is illustrated as internal to the storage device 200 (e.g., a module in firmware); however, the offset table creation module 202 and/or the logical map module 202 may be software or firmware of an external device communicatively coupled to the storage device 200. The offset table 204 created by the offset table creation module 202 is saved in association with the storage device 200, such as in firmware of the storage device 200, so that it may be accessed throughout the lifetime of the storage device 200. In particular, the offset table 204 may be accessed each time data is read from a data block, and used to calculate a seed value for an error detection and correction module that verifies the integrity of the data stored in the data block.

Figure 3:
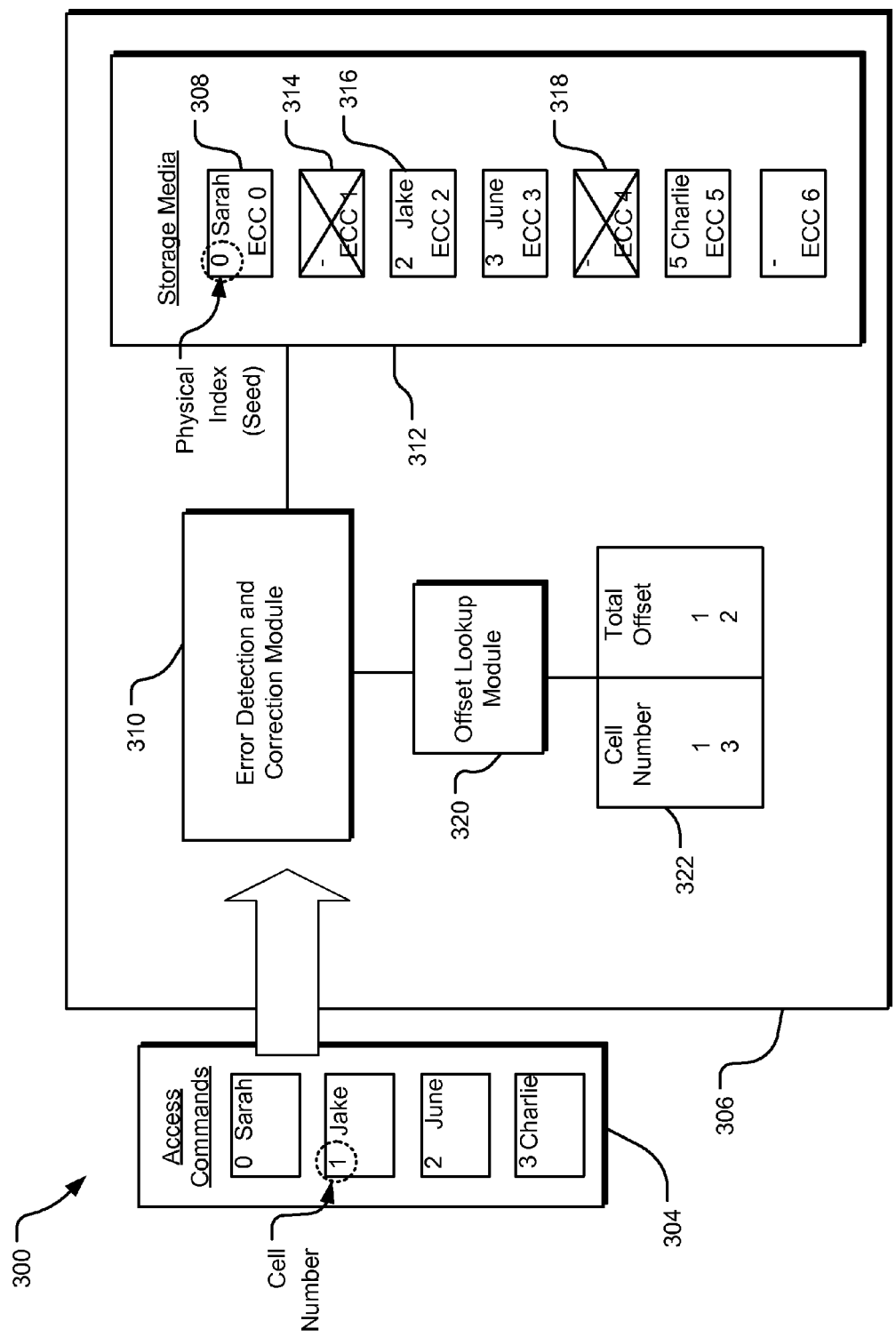
FIG. 3 illustrates another system having a mechanism for verifying data read from a data block when the cell number of the data block does not match an ECC value stored in the data block.

FIG. 3 illustrates another system 300 having a mechanism (e.g., an offset lookup module 310) for verifying data read from a data block when the cell number of the data block does not match an ECC value stored in the data block. The system includes a host computer (not shown) that sends one or more access commands 304 (e.g., read and write commands) to a storage device 306. The storage device 306 also includes an offset lookup module 320, an offset table 322, and a storage media 312. The storage media 312 includes a number of data blocks (e.g., a data block 308) for storing data. Each of the data blocks has a physical index (e.g., a physical index 0 in data block 308) associated with the data block's physical position in an indexed sequence of data blocks on the storage media 312. Additionally, each of the data blocks contains EEC information that encodes the physical index of the data block. For example, the data block 308 has an ECC value 'ECC 0' that encodes the physical index "0" of the data block.

During a factory processing operation of the storage device 306, unusable data blocks (e.g., unusable data blocks 314 and 318) are identified. An offset table creation module (not shown), which may be the same or similar as the offset table creation module described with respect to FIG. 2, creates an offset table 322. The offset table 322 includes a first column titled "Cell Number." Here, the cell number sequence represents the unbroken sequence of usable blocks. Only select cell numbers are listed in the offset table 322. The offset table 322 also includes a column titled "Total Offset" which includes an offset that can be used to convert a given cell number to a value that may be passed as a seed to the error detection and correction module 310.

In FIG. 3, the host computer sends an access command 304 to write four name four names (e.g., Sarah, Jake, June, and Charlie) to four target data blocks associated with the cell numbers 0, 1, 2, and 3. In particular, the host sends LBAs to the storage device 306, and the storage device converts the LBAs into the associated cell numbers 0-3. Using existing techniques, the storage device determines that the data associated with the cell numbers 0-3 may be written to physical indices 0, 2, 3, and 5, respectively.

When data is subsequently read back from one of the target data blocks, the offset lookup module 320 of the storage device 306 accesses the offset table 322 and retrieves an offset associated with each cell number. In the example illustrated, the offset lookup module 320 retrieves an offset of 0 associated with cell number 0; an offset of 1 associated with the cell numbers 1 and 2; and an offset of 2 associated with the cell number 3. By adding the cell number of each target data block to the associated offset, the offset lookup module 310 calculates a seed value (for each target data block) that is input to the error detection and correction module 310. The error detection and correction module 310 uses the seed value to verify the integrity of data stored in the target data block. Consequently, the error detection and correction module 310 can detect and correct errors in the data by calculating an ECC value and comparing it to an ECC value stored in the target data block. If the calculated ECC value and the stored ECC value satisfy an integrity condition (e.g., if the values match or satisfy some other correlation), then the integrity of the data written to the target data block is verified.

For example, to ensure that the name "Jake" is written correctly and to the correct data block, the physical index 2 (calculated by adding together the associated cell number and offset from the offset table 322) is input to the error detection and correction module 310 along with the data written to the cell with the physical index 2 (e.g., "Jake"). Using these inputs, the error detection and correction module 310 calculates an ECC value (e.g., ECC 2), which matches the ECC value stored on the data block with the physical index 2 (e.g., ECC 2).

Both the error detection and correction module 310 and the offset lookup module 320 are illustrated as internal to the storage device 306 (e.g., firmware). However, either of both of the modules may also be software or firmware of an external device communicatively coupled to the storage device 300.

Figure 4:
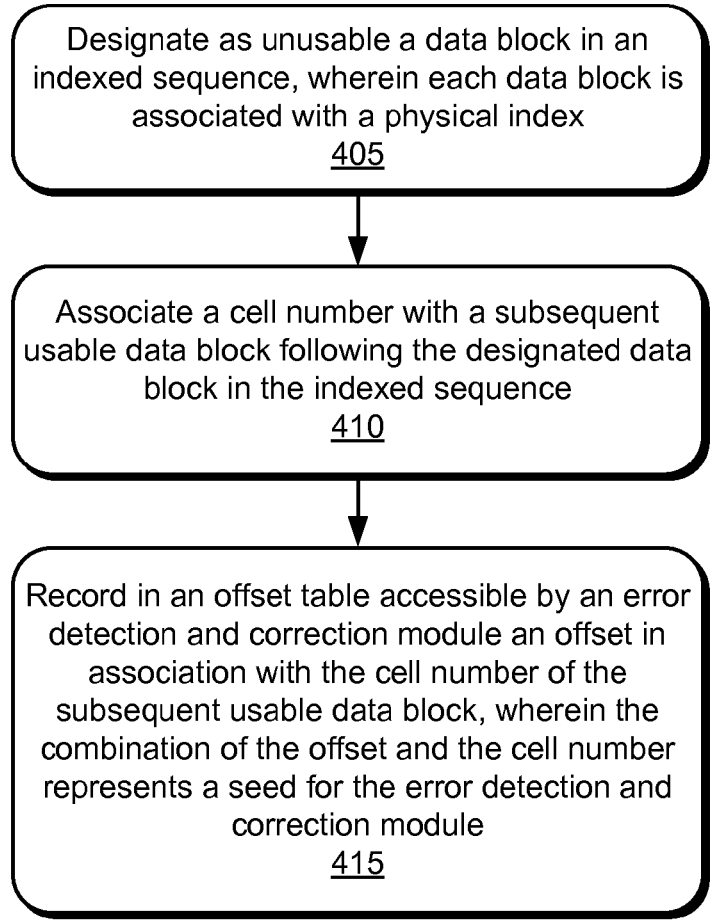
FIG. 4 illustrates example operations for creating an offset table that can be used to calculate a seed value for an error detection module.

FIG. 4 illustrates example operations for creating an offset table that can be used to calculate a seed value for an error detection module. A designation operation 405 designates as unusable a data block in an indexed sequence, wherein each data block is associated with a physical index. The indexed sequence is a sequence including both usable and unusable data blocks on a storage device. In one implementation, sequential data blocks on a storage device are assigned consecutively increasing physical indices in the indexed sequence. An association operation 410 associates a cell number with a subsequent usable data block following the identified data block in the indexed sequence. A recording operation 415 records in an offset table an offset in association with the cell number of the subsequent usable data block, wherein the offset is used to generate an ECC value of the subsequent usable data block. In one implementation, the offset is added to the associated cell number to create a seed value for an error detection and correction module that calculates the ECC value. The calculated ECC value and an ECC value encoded on the subsequent usable data block satisfy an integrity condition ensuring the integrity of data written to the subsequent usable data block.

In one implementation, the offset recorded is a delta between the cell number and the physical index of the subsequent usable data block The offset may be recorded in the offset table in association with a first data block in the indexed sequence affected by the offset. In one implementation, the data blocks in the indexed sequence are consecutive sectors along a data track on a magnetic disc.

In one implementation, the example operations 400 are performed during an initial factory formatting of a storage device. The operations 405-415 may be repeated multiple times at the factory, and offsets may be recorded in relation to each of a number of selectively omitted (i.e., unusable) data blocks on the disc.

Figure 5:
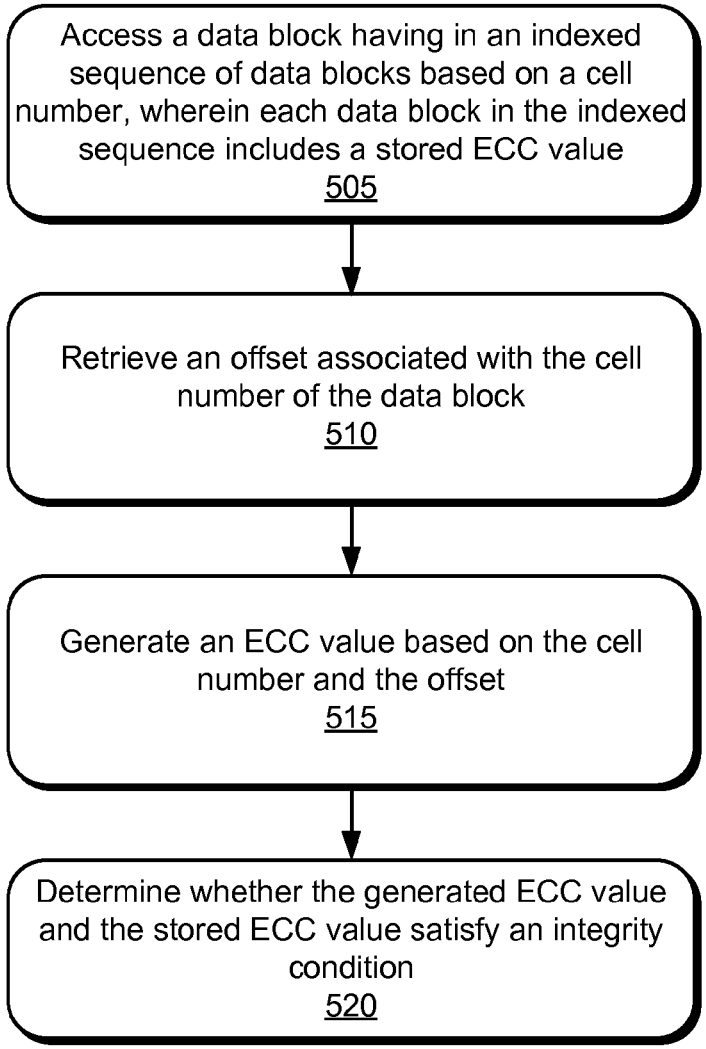
FIG. 5 illustrates example operations for verifying data read from a data block when the cell number of the data block does not match an ECC value stored in the data block.

FIG. 5 illustrates example operations 500 for verifying data read from a data block when the cell number of the data block does not match an ECC value stored in the data block. An accessing operation 505 accesses a data block having an indexed sequence of data blocks based on a cell number, wherein each data block in the indexed sequence includes a stored ECC value. In one implementation, the indexed sequence of data blocks is a sequence of consecutive data blocks in a storage device. In another implementation, the data blocks are sectors along a data track in a magnetic media disc.

A retrieving operation 510 retrieves an offset associated with the cell number of the data block. In one implementation, the retrieving operation 510 retrieves the offset by accessing an offset access table, which may be stored in the firmware of the storage device.

A generation operation 515 generates an ECC value based on the cell number and the offset retrieved. In one implementation, the determining operation 515 generates the ECC value by seeding an error detection and correction module with the sum of the cell number and the offset.

A determination operation 520 determines whether the generated ECC value and the stored ECC value satisfy an integrity condition. In one implementation, the integrity condition is satisfied if the generated ECC value and the encoded ECC value are equal.

Figure 6:
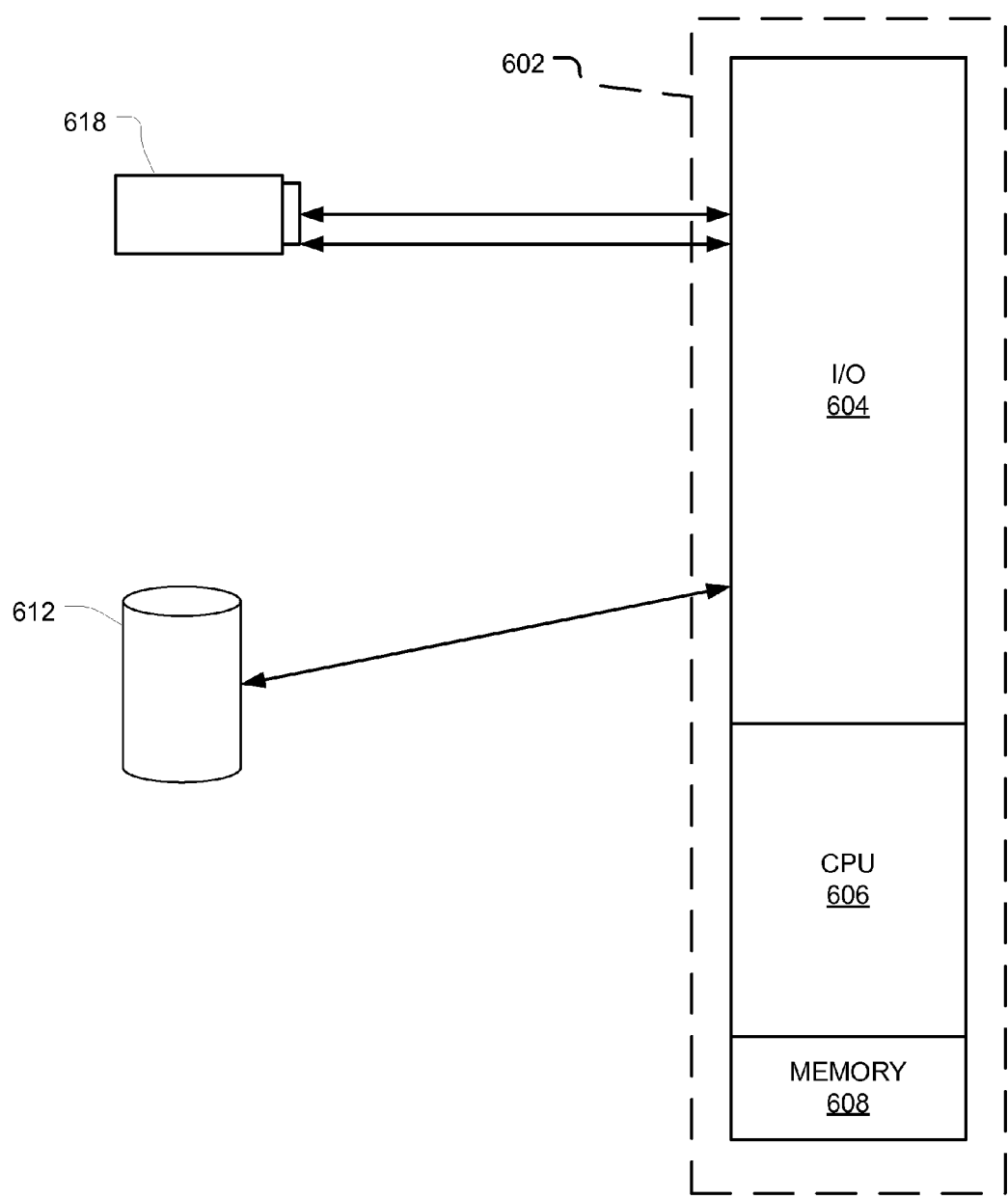
FIG. 6 discloses a block diagram of a computer system suitable for implementing one or more aspects of a system for selective omission of one or more data blocks in an indexed sequence of target data blocks during a disc accessing operation.

FIG. 6 discloses a block diagram of a computer system 600 suitable for implementing one or more aspects of a system for selective omission of one or more data blocks in an indexed sequence of target data blocks during a disc accessing operation. In one implementation, the computer system 600 is communicatively coupled to a storage device having an offset table creation module, an error detection and correction module, and/or an offset lookup module that retrieves an offset to calculate a seed associated with a data block for an error detection and correction operation.

The computer system 600 is capable of executing a computer program product embodied in a tangible computer-readable storage medium to execute a computer process. The tangible computer-readable storage medium is not embodied in a carrier-wave or other signal. Data and program files may be input to the computer system 600, which reads the files and executes the programs therein using one or more processors. Some of the elements of a computer system are shown in FIG. 6, wherein a processor 602 is shown having an input/output (I/O) section 604, a Central Processing Unit (CPU) 606, and a memory section 608. There may be one or more processors 602, such that the processor 602 of the computing system 600 comprises a single central-processing unit 606, or a plurality of processing units. The computing system 600 may be a conventional computer, a distributed computer, or any other type of computer. The described technology is optionally implemented in software loaded in memory 608, a disc storage unit 612, or removable memory 618.

In an example implementation, the error detection and correction module, offset lookup module and/or offset table creation module may be embodied by instructions stored in memory 608 and/or the storage unit 612 and executed by the processor 607. Further, local computing system, remote data sources and/or services, and other associated logic represent firmware, hardware, and/or software which may be configured to adaptively distribute workload tasks to improve system performance. The error detection and correction module, offset lookup module, and/or offset table creation module may be implemented using a general purpose computer and specialized software (such as a server executing service software), and a special purpose computing system and specialized software (such as a mobile device or network appliance executing service software), or other computing configurations. In addition, program data, such the offset table may be stored in the memory 608 and/or the storage unit 612 and executed by the processor 602.

The implementations of the invention described herein are implemented as logical steps in one or more computer systems. The logical operations of the present invention are implemented (1) as a sequence of processor-implemented steps executing in one or more computer systems and (2) as interconnected machine or circuit modules within one or more computer systems. The implementation is a matter of choice, dependent on the performance requirements of the computer system implementing the invention. Accordingly, the logical operations making up the embodiments of the invention described herein are referred to variously as operations, steps, objects, or modules. Furthermore, it should be understood that logical operations may be performed in any order, adding and omitting as desired, unless explicitly claimed otherwise or a specific order is inherently necessitated by the claim language.

The above specification, examples, and data provide a complete description of the structure and use of exemplary implementations of the invention. Since many implementations of the invention can be made without departing from the spirit and scope of the invention, the invention resides in the claims hereinafter appended. Furthermore, structural features of the different implementations may be combined in yet another implementations without departing from the recited claims.

What is claimed is:

1. A method comprising:
   designating as unusable a data block in an indexed sequence of data blocks, wherein each data block is associated with a physical index;
   associating a logical block address with a subsequent usable data block following the designated unusable data block in the indexed sequence; and
   recording in an offset table accessible by an error detection and correction module an offset in association with the logical block address of the subsequent usable data block, the offset representing a difference between the logical block address of the subsequent usable data block and the physical index of the subsequent usable data block, wherein a combination of the offset and the logical block address represents a seed for the error detection and correction module.

2. The method of claim 1, wherein recording the offset in the offset table further comprises recording the offset in association with a first data block in the indexed sequence affected by the offset.

3. The method of claim 1, wherein recording the offset is performed during a factory formatting operation of a storage device.

4. The method of claim 1, wherein the offset table is stored in firmware of a storage device.

5. The method of claim 1, wherein the indexed sequence includes consecutively increasing indices associated with sequential data blocks on a storage device.

6. The method of claim 1, wherein the data blocks in the indexed sequence are consecutive sectors along a data track on a magnetic disc.

7. One or more tangible processor-readable storage media encoding processor-executable instructions for executing on a processor-based system a computing process, the computing process comprising:
   designating as unusable a data block in an indexed sequence of data blocks, wherein each data block is associated with a physical index;
   associating a logical block address with a subsequent usable data block following the designated unusable data block in the indexed sequence; and
   recording in an offset table accessible by an error detection and correction module an offset in association with the logical block address of the subsequent usable data block, the offset representing a difference between the logical block address of the subsequent usable data block and the physical index of the subsequent usable data block, wherein a combination of the offset and logical block address represents a seed for the error detection and correction module.

8. The one or more computer-readable storage media of claim 7, wherein recording the offset in the offset table further comprises recording the offset in association with a first data block in the indexed sequence affected by the offset.

9. The one or more computer-readable storage media of claim 7, wherein recording the offset is performed during a factory formatting operation of a storage device.

10. The one or more computer-readable storage media of claim 7, wherein the offset table is stored in firmware of a storage device.

11. The one or more computer-readable storage media of claim 7, wherein the indexed sequence includes consecutively increasing indices associated with sequential data blocks on a storage device.

12. The one or more computer-readable storage media of claim 7, wherein the data blocks in the indexed sequence are consecutive sectors along a data track on a magnetic disc.

13. A system comprising:
   a storage device; and
   an error detection module configured to identify as unusable a data block in an indexed sequence of data blocks, wherein each data block is associated with a physical index; and
   an offset table creation module configured to:
      associate a cell number with a subsequent usable data block following the identified unusable data block in the indexed sequence, the cell number based on a logical block address of a host device; and
      record in an offset table accessible by an error detection and correction module an offset in association with the cell number of the subsequent usable data block, the offset representing a difference between the cell number of the subsequent usable data block and the physical index of the subsequent usable data block, wherein a combination of the offset and the cell number represents a seed for the error detection and correction module.

14. The system of claim 13, wherein the offset table creation module is further configured to record the offset in association with a first data block in the indexed sequence affected by the offset.

15. The system of claim 13, wherein offset table creation module records the offset during a factory formatting operation on the storage device.

16. The system of claim 13, wherein the offset table is stored in firmware of the storage device.

17. The system of claim 13, wherein the indexed sequence includes consecutively increasing indices associated with sequential data blocks on the storage device.

18. The method of claim 1, wherein the unusable data block is a block that is selectively omitted from all storage operations of the device.

* * * * *